United States Patent [19]

VanDeVyvere

[11] Patent Number: 5,275,202
[45] Date of Patent: Jan. 4, 1994

[54] ADJUSTABLE EMERGENCY RELIEF VENT WITH SURGE PROTECTION

[75] Inventor: Bryan E. VanDeVyvere, Lees Summit, Mo.

[73] Assignee: Knappco Corporation, Kansas City, Mo.

[21] Appl. No.: 961,503

[22] Filed: Oct. 15, 1992

[51] Int. Cl.$^5$ ............................................... F16K 17/04
[52] U.S. Cl. ..................................... 137/492; 137/509
[58] Field of Search ............................... 137/492, 509

[56] References Cited

U.S. PATENT DOCUMENTS

| | | |
|---|---|---|
| 1,173,834 | 2/1916 | Metzger . |
| 1,402,016 | 1/1922 | Raymond . |
| 1,806,925 | 5/1931 | Trapper . |
| 1,995,826 | 3/1935 | Soderberg . |
| 2,235,304 | 3/1941 | Toussaint . |
| 2,375,410 | 5/1945 | Gondek et al. . |
| 2,757,870 | 8/1956 | Velan . |
| 3,102,553 | 9/1963 | Ottestad . |
| 3,164,166 | 1/1965 | Tennis . |
| 3,414,008 | 12/1968 | Greenwood .......................... 137/492 |
| 3,741,242 | 6/1973 | Hansen et al. . |
| 3,886,969 | 6/1975 | Shira .................................. 137/509 |
| 3,972,345 | 8/1976 | Court . |
| 4,197,877 | 4/1980 | Winiasz . |
| 4,681,135 | 7/1987 | Tillman ........................... 137/489.5 |
| 4,763,688 | 8/1988 | Morris .............................. 137/509 |
| 4,848,397 | 7/1989 | Bickford .......................... 137/509 |
| 4,977,925 | 12/1990 | Tiefenthaler .................... 137/489.5 |
| 5,048,553 | 9/1991 | Van De Vyvere .................. 137/43 |

Primary Examiner—Robert G. Nilson
Attorney, Agent, or Firm—Silverman, Cass & Singer, Ltd.

[57] ABSTRACT

A vent for relieving pressure from within a storage tank at a predetermined tank pressure through an opening in the tank including a mounting member for connecting the vent in sealed engagement with the opening and for providing a valve opening and associated valve seat, a poppet member for closing the valve seat at tank pressures less than the predetermined tank pressure and for opening the valve seat at tank pressures equal to and greater than the predetermined tank pressure to enable venting of the tank pressure to atmosphere, and an adjusting member for altering the predetermined tank pressure at which the poppet member opens.

5 Claims, 3 Drawing Sheets

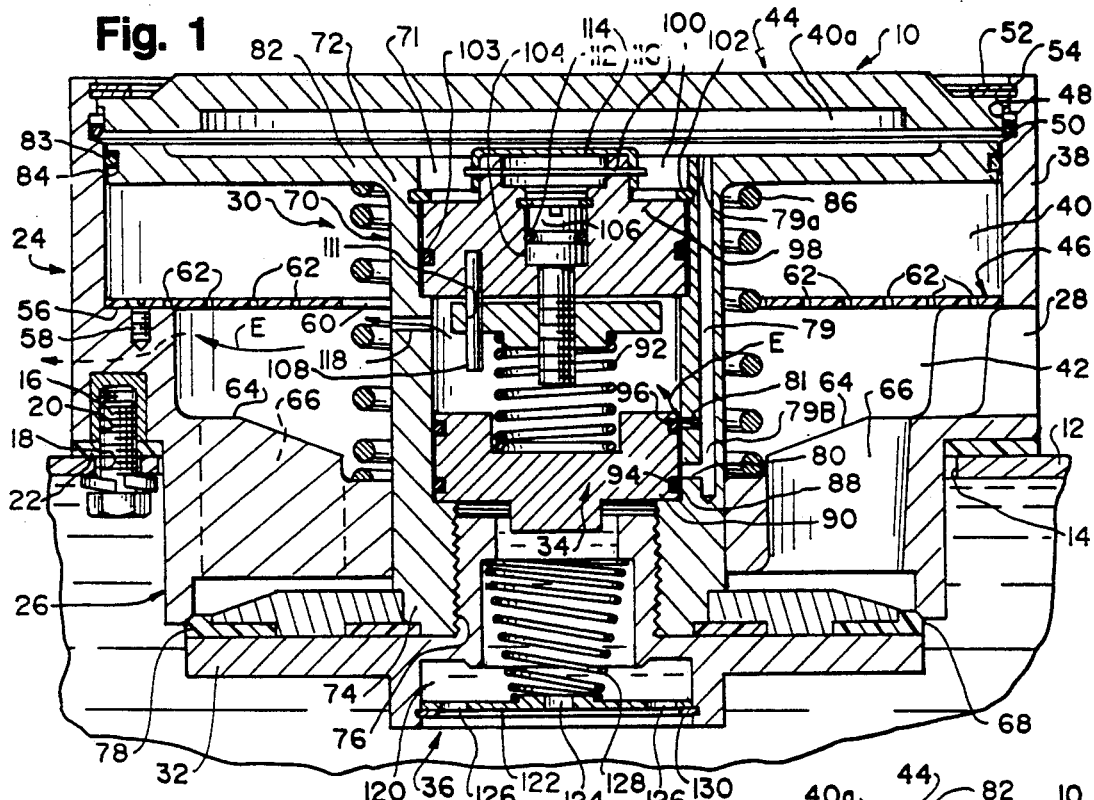

ADJUSTABLE EMERGENCY RELIEF VENT WITH SURGE PROTECTION

BACKGROUND OF THE INVENTION

1. Field of the Invention

This invention relates generally to pressure relief vents for storage tanks, and more particularly, to a relief vent for a fluid storage tank which includes an internal poppet that regulates pressure flow through the vent and can be adjusted to vary the pressure at which the vent opens to release pressure within the tank to atmosphere and prevents venting for a short period of time during sudden or rapid surge pressure conditions.

2. Description of the Related Art

Storage tanks for retaining liquids, particularly flammable or corrosive liquids, typically are provided with pressure relief vents or valves which limit the internal pressure within the tank to a predetermined value for safety. When the pressure inside the tank rises, such relief valves automatically open at a predetermined pressure value to relieve the excess pressure within the tank by venting to atmosphere. When the pressure inside of the tank is reduced below the predetermined pressure value, the relief vent or valve automatically closes and maintains pressure within the tank below the predetermined value.

During storage, use and transportation of such tanks, overturns of the tank frequently occur, such as a tank falling over or a tank rolling over in an accident. Overturns produce a very sudden liquid surge which in turn develops internal pressures within the tank which are of an extremely high value and have relatively short duration. For example, for some liquids, an overturn can create a sudden liquid surge lasting as little as two milliseconds which can develop internal pressures on the order of fifty pounds per square inch which can persist within the tank for approximately fifty milliseconds.

Surge pressures in a typical storage tank and relief vent or valve can lead to a release of large quantities of liquid from the tank by either blowing the relief vent itself or a hatch, such as a manhole cover, off the tank. Alternatively, if the relief valve assembly and other hatches hold, significant quantities of liquid may be sprayed out of the venting relief valve which can create a gaseous fog in the vicinity of the tank.

Relief valves which address such surge problems are illustrated, for example, in U.S. Pat. Nos. 4,763,688 and 5,048,553, both of said patents being owned by the assignee of the present application. Both of these patents include a snubber surge valve assembly for a relief valve which impedes the rate at which pressure can build within the relief valve upon sudden pressure rise, such as an overturn situation, to increase the time before which the relief valve can vent to atmosphere. Neither of those patents, however, disclose a vent or valve which can be adjusted before or after installation to change the pressure at which the vent or valve will release.

It therefore would be desirable to provide a relief vent for a storage tank which operates to vent to atmosphere at a predetermined pressure, momentarily prevents opening of the vent upon overturn but permits venting after a short period of time and which can be adjusted before or after assembly to the tank to vary the pressure at which the relief valve opens.

SUMMARY OF THE INVENTION

The invention provides a vent for relieving pressure from within a storage tank at a predetermined tank pressure through an opening in the tank. The vent includes a mounting member for connecting the vent in sealed engagement with the tank opening and for providing a valve opening and an associated valve seat. A poppet member is included for closing the valve seat at tank pressures less than the predetermined tank pressure and for opening the valve seat at tank pressures equal to and greater than the predetermined tank pressure to enable venting of the tank pressure to atmosphere. An adjusting member also is included for altering the predetermined tank pressure at which the poppet member opens.

BRIEF DESCRIPTION OF THE DRAWINGS

FIG. 1 is a cross-sectional view of the relief vent of the invention illustrated connected to an opening in a storage tank and in its fully closed position;

FIG. 2 is a cross-sectional view of the relief vent of the invention, similar to FIG. 1, illustrating the internal poppet in its open position to allow build up of pressure within the piston chamber;

DESCRIPTION OF THE PREFERRED EMBODIMENTS

Figure 3:
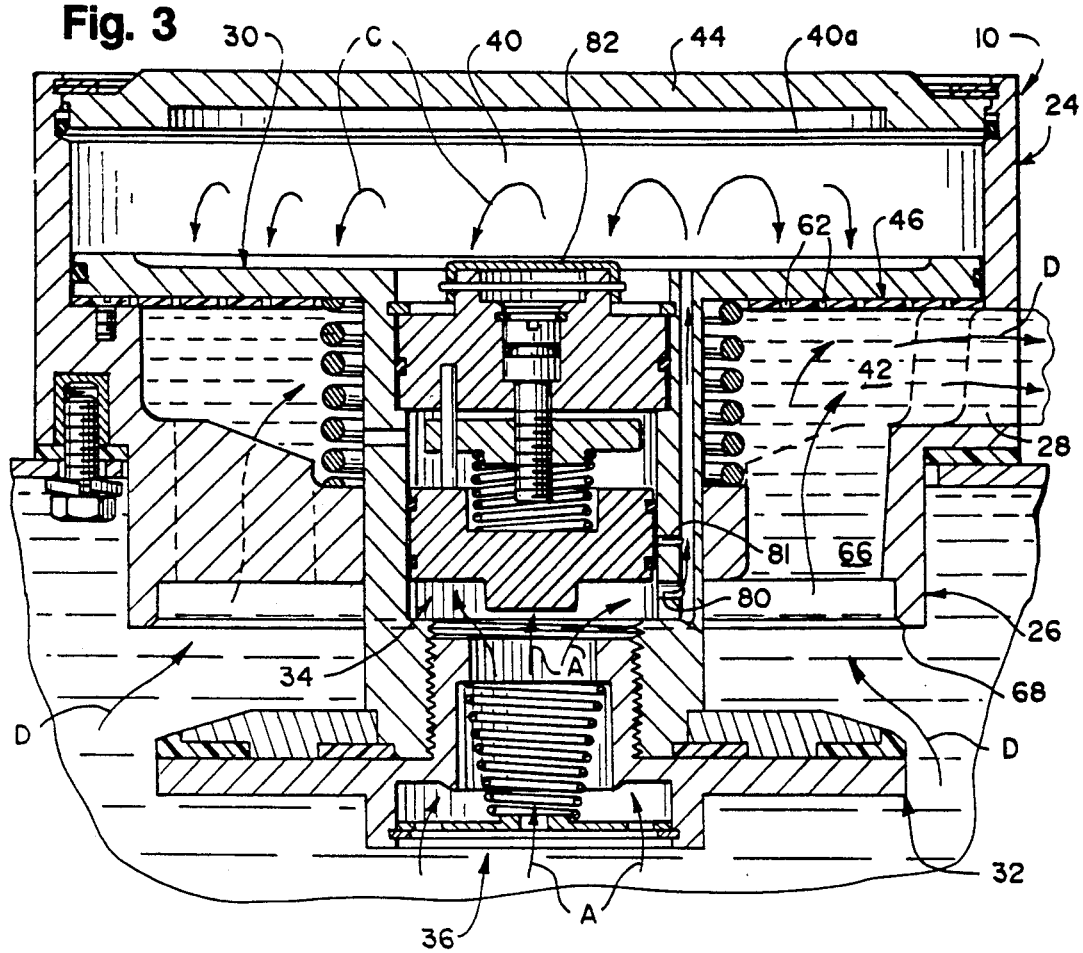
FIG. 3 is a cross-sectional view of the relief vent of the invention, similar to FIGS. 1 and 2, illustrating normal venting.

Referring to FIG. 1, a relief vent or valve embodying the invention is designated generally by the reference numeral 10. The vent 10 typically is utilized with a storage tank 12 and is fitted within and overlies a manhole or opening 14 in the tank 12.

In order to secure the vent 10 to the tank 12, bolts 16 are inserted through apertures 18 formed in the tank 12 and threaded into threaded apertures 20 formed in the vent 10. To assist in sealing the vent 10 against the tank 12, a gasket 22 can be inserted therebetween.

It is to be understood that the relief vent 10 can be utilized with a variety of storage tanks 12, including a tanker truck or the like, and its use is not limited to the material contained within the tank 12. Additionally, the relief vent 10 can be secured to the tank 12 in a variety of ways and, although preferably constructed of metal, the vent 10 can be made of a variety of materials without departing from the teachings of the present invention.

Figure 6:
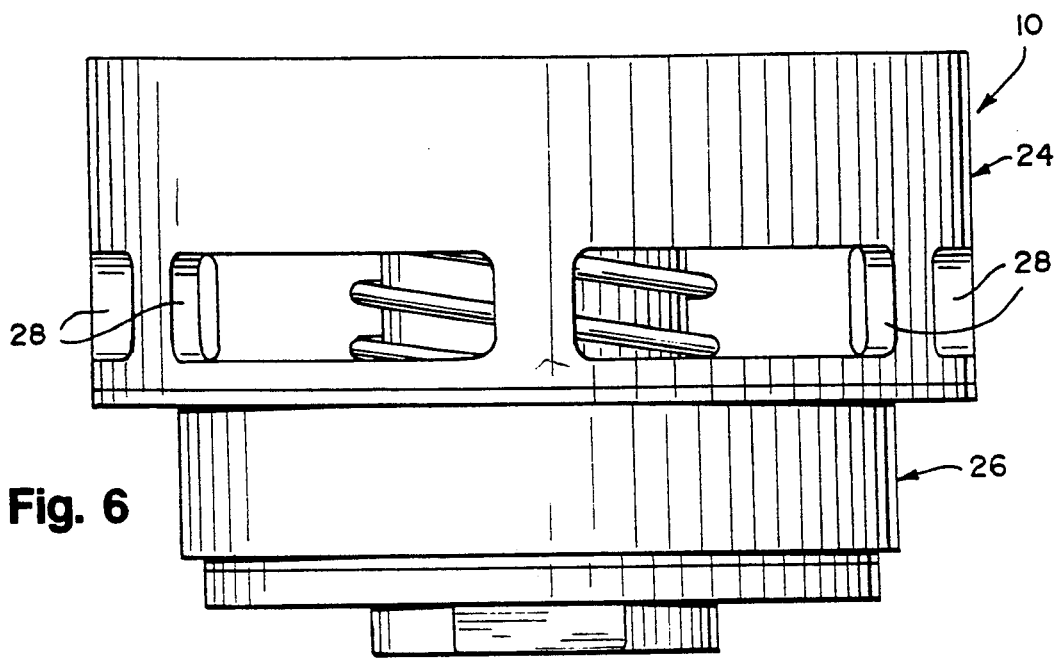
FIG. 6 is a side elevational view of the relief vent of the invention without the tank.

The vent 10 substantially is constructed as a mounting member or housing having a first exterior portion 24 positioned on the exterior of the tank 12 and a second interior portion 26 positioned within the interior of the tank 12. In order to allow the pressure to escape from the vent 10 when in its open position as described below, the first exterior portion 24 of the vent 10 includes vent openings 28, also illustrated in FIG. 6, positioned about the perimeter of the vent 10.

The major components of the vent 10 include a piston assembly 30, a first poppet 32, a second adjustable internal poppet assembly 34 and a snubber valve assembly 36. The structural details of each of these components will be provided hereinafter.

Briefly, in operation, the main pressure release sequence followed by the vent 10 is illustrated in FIGS. 1-3. In the closed position illustrated in FIG. 1, the vent 10 is subjected to pressure which builds up within the tank 12. As FIG. 2 illustrates, the second internal poppet assembly 34 is exposed to the tank pressure through the snubber valve assembly 36 along flow lines "A". Upon reaching a set pressure the second internal poppet assembly 34 moves upward to open a flow path "B" through the vent 10 which enables pressure to accumulate in a piston chamber. As FIG. 3 illustrates, the pressure build up within the piston chamber enables the piston assembly 30 to move downward in the direction of arrows "C". This movement of the piston assembly 30 enables the first poppet 32 to open thereby providing the main pressure release to atmosphere along flow lines "D". The operation of the snubber valve assembly 36 to momentarily prevent surge pressure from opening the vent 10 will be described below.

Referring now to FIG. 1, the first external portion 24 of the vent 10 is formed as a substantially circular member defined by a closed annular side wall 38 including a first internal recess or chamber 40 and a second reduced diameter recess or chamber 42 which includes the vent openings 28. The first chamber 40 is closed at a first external end by a cap 44 and at a second opposite end by a disc 46 which separates the first and second chambers 40 and 42.

To seal the end cap 44 to the side wall 38, the end cap 44 includes a peripheral groove 48 for retaining an O-ring 50. To retain the end cap 44 to the side wall 38 within the confines of the first chamber 40, a removable retaining ring 52 is provided which seats within an annular groove 54 provided within the side wall 38. Alternatively, the retaining ring 52 can be threaded to the side wall 38 (not illustrated) or the end cap 44 can be connected in a variety of ways so long as it is properly connected and can readily be removed for adjusting the vent 10 as described below.

The disc 46 is connected to a rim 56, formed between the first and second chambers 40 and 42, by screws 58. For accommodating the piston assembly 30, an enlarged central aperture 60 is included through the disc 46. Additionally, to vent the first chamber 40 to the second chamber 42 and to atmosphere through openings 28 during movement of the piston assembly 30, the disc 46 includes a plurality of apertures 62 positioned about its surface.

Alternatively, as FIG. 2 illustrates, the apertures 62 can be omitted and the venting of the first chamber 40 can take place through the enlarged central aperture 60 which is slightly larger than the stem of the piston assembly 30. Thus, the disc 46a is solid except for the central aperture 60 and assists in preventing premature valve closure by deflecting pressure flow outward through vent openings 28 along lines "D" illustrated in FIG. 3.

The second chamber 42 is closed at a bottom surface 64 opposite the disc 46 and includes a plurality of channels 66 formed therethrough. The channels 66 extend through the bottom surface 64 and open to a valve seat 68 formed about the lower portion of the second internal portion 26 of the vent 10.

The piston assembly 30 is utilized to open and close the valve seat 68 and includes a hollow piston stem 70 having an interior recess 71 therethrough, a first end 72 positioned within the first chamber 40 and extends into the second chamber 42 through the large central aperture 60 of the disc 46 and terminates in a second opposite end 74. To provide a seal against the valve seat 68, the second opposite end 74 includes the first poppet 32 connected thereto by threaded engagement within an interior recess 76 that includes a sealing gasket 78 for direct contact with the valve seat 68.

To provide the flow path "B", the wall of the piston stem 70 can include one or more flow channels 79, each channel 79 including a first end 79a in communication with a first portion 40a of the first chamber 40 of the vent 10 and a second end 79b which is open to the stem recess 71 by way of first and second apertures 80 and 81.

The piston assembly 30 includes a piston head 82 integrally formed with the first end 72 of the piston stem 70 and is positioned within the first chamber 40 and forms the first portion 40a between the piston head 82, the end cap 44 and the side wall 38. To provide sealed sliding engagement with the side wall 38 of the first chamber 40, the piston head 82 can include an O-ring 83 which seats within a channel 84 formed about the perimeter of the piston head 82.

To provide a bias to the piston assembly 30 and urge the first poppet 32 into the closed position of the vent 10, as illustrated in FIG. 1, a first main spring 86 is included. The first spring 86 is positioned about the piston stem 70 to provide a predetermined force between the piston head 82 and the bottom 64 of the second chamber 42 of the vent 10.

The second adjustable internal poppet assembly 34 is positioned within the stem recess 71 and regulates initial pressure accumulation within the vent 10. The internal poppet assembly 34, proximate a first internal end 88 of the piston stem recess 71 includes a second internal poppet 90 which is spring biased in its closed position illustrated in FIG. 1 by a second spring 92. To provide sealed sliding engagement of the second internal poppet 90 within the stem recess 71, first and second O-rings 94 and 96 are provided about the periphery of the second internal poppet 90.

To mount the second internal poppet 90 and the second spring 92 within the stem recess 71, a base member 98 is included proximate a second end 100 of the stem recess 71 which is secured therein by a retaining ring 102 and sealed by an O-ring 103. The base member 98 includes a central aperture 104 having an adjustment screw 106 therethrough which is threaded to a spring block 108 which engages the second spring 92 to provide the desired bias to the second internal poppet 90.

Turning of the screw 106 provides movement of the spring block 108 along a guide pin 110 which prevents rotation of the spring block 108, extends through an aperture 111 in the spring block 108 and is connected to the base member 98. Thus, movement of the spring block 108 adjusts the compression of the second spring 92 and the bias against the second internal poppet 90. This adjustment enables the pressure at which the vent 10 opens to be adjusted either before or after assembly to the tank 12. The screw 106 is sealed within the central aperture 104 of the base member 98 by an 0-ring 112 and a protective screw cover 114, the cover 114 being held in place by a retaining wire 116 or similar member.

Figure 7:
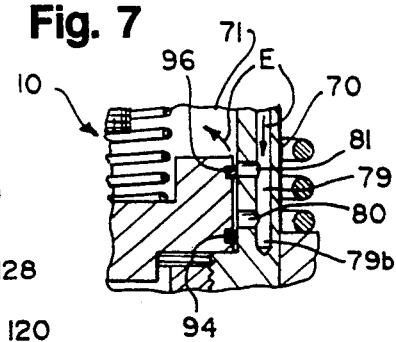
FIG. 7 is an enlarged cross-sectional view of a portion of the internal poppet of the relief vent in the fully closed position of FIG. 1 illustrating venting of the piston chamber.

As FIGS. 1 and 7 illustrate, the first 0-ring 94 of the second internal poppet 90 contacts the wall of the stem recess 71 slightly below the first aperture 80 within the piston stem 70 to prevent flow into the flow channel 79 from the tank 12. The second 0-ring 96, however, merely blocks a substantial portion of the second aperture 81 of the flow channel 79 and allows the pressure from within the first portion 40a of the first chamber 40 to bleed out, as illustrated by flow arrows "E", into the stem recess 71 to eventually escape to atmosphere through an aperture 118 formed in the piston stem 70 at a position remote from the flow channel 79.

Figure 5:
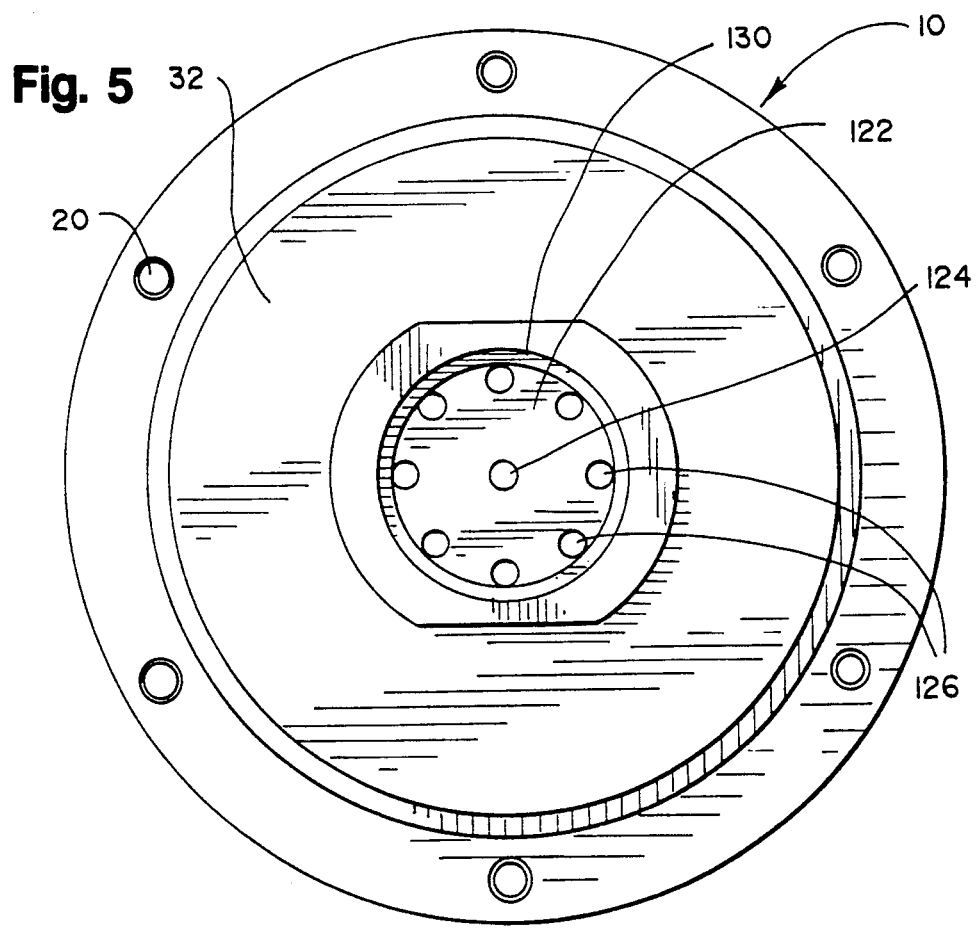
FIG. 5 is bottom plan view of the relief vent of the invention without the tank, illustrating a portion of the snubber valve assembly.

To protect against sudden surge pressures, the snubber valve assembly 36 is positioned within a recess 120 provided in the first poppet 32. The snubber valve assembly 36 includes a disc 122 having a central aperture 124 and a plurality of apertures 126 formed in a circle surrounding the central aperture 124 as FIG. 5 illustrates. To spring bias the disc 122 in the open position illustrated in FIG. 1, a third spring 128 is included between a bottom of the recess 120 and the disc 122, the disc 122 being retained within the recess 120 against the force of the spring 128 by a retaining ring 130.

In operation, when sufficient pressure develops inside the tank 12, the vent 10 moves from the closed position of FIG. 1 to the open position of FIG. 3 where the pressure can escape to the atmosphere. To accomplish this, as the pressure within the tank 12 approaches the set pressure of the vent 10, the second internal poppet 90, which is exposed to the tank pressure through the apertures 124 and 126 of the snubber disc 122 as shown by arrows "A", first moves upward with respect to FIG. 1 to the position illustrated in FIG. 2.

In this position, the first aperture 80 is open to the flow channel 79 and pressure flows in the direction of arrows "B" into the first portion 40a of the first chamber 40 of the vent 10 between the piston head 82 and the end cap 44. The force developed in the first portion 40a of the first chamber 40 forces the piston head 82 downward in the direction of arrows "C" as FIG. 3 illustrates causing air within the first chamber 40 to escape through apertures 62 and/or 60 in the disc 46 and, at the same time, the first poppet 32 opens the valve seat 68. Once the valve seat 68 is opened, the pressure from within the tank 12 can escape to atmosphere through the vent 10 in the direction of arrows "D" by way of the channels 66 and into the second chamber 42 to exit to atmosphere through the vent openings 28.

After the pressure within the tank 12 is relieved, the second spring 92 moves the second internal poppet 90 back to the position illustrated in FIG. 1 where the first aperture 80 is closed. This in turn will enable the piston head 82 and the first poppet 32 to move back to their closed positions by venting the first portion 40a and the first chamber 40 to atmosphere back through the flow channel 79 as illustrated by arrows "E" in FIGS. 1 and 7 through the second aperture 81, into the stem recess 71 and out the stem aperture 118 and vent openings 28.

Figure 4:
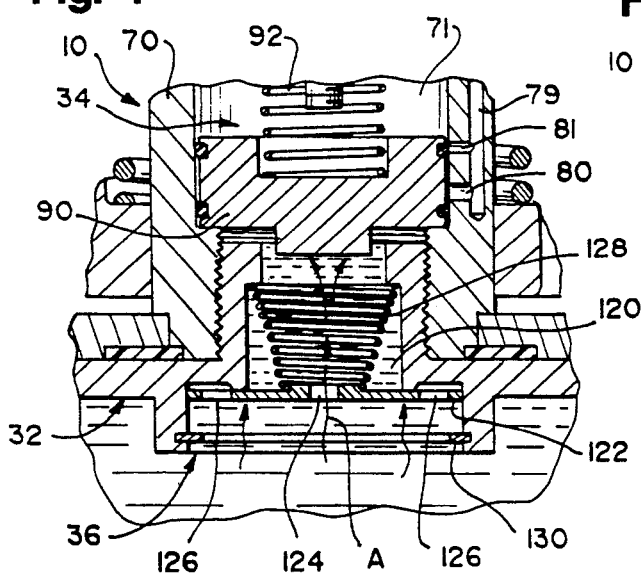
FIG. 4 is an enlarged cross-sectional view of a portion of the relief vent of the invention illustrating the operation of the snubber valve assembly during periods of excess surge pressure within the tank.

When a sudden surge pressure develops in the tank 12, such as when then tank 12 is overturned, the increased sudden pressure acts across the surface area of the snubber disc 122 to overcome the bias of the third spring 128 and forces the snubber disc 122 upward, as illustrated in FIG. 4, which seals the apertures 126 against a portion of the recess 120 in the first poppet 32. This cuts the flow of pressure against the second internal poppet 90 since only the central aperture 124 of the snubber disc 122 is open to the second internal poppet 90. This in turn causes a momentary delay in developing pressure against the second internal poppet 90 to delay the opening of the vent 10 which is all that is necessary to prevent spraying of gas and/or liquid out of the tank 12. After the surge pressure has receded, the snubber disc 122 can return to its original position as illustrated in FIG. 1 to enable normal venting as described above.

To adjust the pressure at which the second internal poppet 90 is set, the retaining ring 52 and end cap 44 are removed to provide access to the screw cover 114. The retaining wire 116 and cover 114 then are removed and the screw 106 and spring bias of the spring 92 can be adjusted as desired.

Modifications and variations of the present invention are possible in light of the above teachings. A specific dimension, material or construction is not required so long as the assembled device is able to function as herein described. It is therefore to be understood that within the scope of the appended claims, the invention may be practiced otherwise than as specifically described.

What is claimed and desired to be secured by letters patent is:

1. A vent for relieving pressure from within a storage tank at a predetermined tank pressure through an opening in the tank comprising:

mounting means for connecting said vent in sealed engagement with the opening and for providing a valve opening and an associated valve seat, said valve seat being in communication with ambient atmosphere and the pressure within said tank;

a piston valve assembly mounted within said mounting means, said assembly including a piston chamber and a piston movable within said piston chamber between a first position in which the vent is closed and a second position in which the vent is open, said piston including a material flow path therethrough extending between said tank and said piston chamber;

first poppet means mounted to said piston and positioned on the exterior of said piston chamber for closing and opening said valve seat when said piston is in said first and second positions;

second poppet means positioned within said piston for regulating pressure flow through said material flow path, said second poppet means including a first position in which said flow path is closed and a second position in which said flow path is open enabling pressure to build up within said piston chamber to move said piston to said second position in which said vent is open; and adjusting means for selectively altering said second poppet means to enable venting at different tank pressures.

2. The vent as defined in claim 1 wherein said vent is self-contained.

3. The vent as defined in claim 1 including surge control means for momentarily preventing opening of said second poppet means upon exposure to tank surge pressures to prevent venting of any surge pressure from the tank and for permitting opening of said second poppet means after a predetermined time period to allow venting of pressure within said tank.

4. A vent for relieving pressure from within a storage tank at a predetermined tank pressure through an opening in the tank comprising:

mounting means for connecting said vent in sealed engagement with said opening and for providing a valve opening and an associated valve seat, said valve opening being in communication with ambient atmosphere and the pressure within said tank;

a piston chamber positioned within said mounting means, said piston chamber having a first closed end, a second opposite end and a closed side wall interconnecting said first and second ends, said second end including at least first and second apertures therethrough;

piston means for movement within said piston chamber to open and close said vent, said piston means being movable between a first position in which the vent is closed and a second position in which the vent is open, said piston means including a piston rod having first and second opposite ends and a piston head forming said first end of said piston rod and mounted within said chamber, said piston rod extending through said first aperture to a position outside said chamber and including a material flow path therethrough extending between said tank and a portion of said piston chamber between said first closed end thereof and said piston head; piston rod for closing and opening said valve seat when said piston means are in said first and second positions, respectively;

first bias means positioned between said piston head and said mounting means for urging said piston head into said first closed position;

second poppet means positioned within said piston rod for regulating pressure flow through said material flow path;

second bias means positioned between said piston rod and said second poppet means for providing a force urging said poppet means into a first position in which said flow path is closed and which when overcome enables movement of said second poppet means to open said flow path enabling pressure build up in said piston chamber to move said piston to said second position against the force of said first bias means to open said valve seat; and adjusting means for altering said force provided by said second bias means and enabling venting at different tank pressures.

5. The vent as defined in claim 4 including surge control means for momentarily preventing opening of said first and second poppet means upon exposure to tank surge pressures to prevent venting of any surge pressure from the tank and for permitting opening of said first and second poppet means after a predetermined time period to allow venting of pressure within said tank.

* * * * *

UNITED STATES PATENT AND TRADEMARK OFFICE
CERTIFICATE OF CORRECTION

PATENT NO. : 5,275,202
DATED      : January 4, 1994
INVENTOR(S): Bryan E. VanDeVyvere It is certified that error appears in the above-indentified patent and that said Letters Patent is hereby corrected as shown below:

Column 4, line 42, after "71" insert a comma (,);

Column 7, line 24, after "head;" start a new paragraph and insert:

--first poppet means connected to said second end of said--.

Signed and Sealed this

Thirty-first Day of May, 1994

*Attest:*

BRUCE LEHMAN

*Attesting Officer*    *Commissioner of Patents and Trademarks*